United States Patent [19]

Binsack et al.

[11] 4,186,154
[45] Jan. 29, 1980

[54] POLYCARBONATE MIXTURES WHICH CAN BE PROCESSED AS THERMOPLASTICS

[75] Inventors: Rudolf Binsack, Krefeld; Eckart Reese, Dormagen; Erhard Tresper, Krefeld; Joachim Wank, Dormagen, all of Fed. Rep. of Germany

[73] Assignee: Bayer Aktiengesellschaft, Leverkusen

[21] Appl. No.: 916,636

[22] Filed: Jun. 19, 1978

[30] Foreign Application Priority Data

Jul. 1, 1977 [DE] Fed. Rep. of Germany ....... 2729763

[51] Int. Cl.$^2$ .............................................. C08L 67/00
[52] U.S. Cl. ................................ 525/461; 260/37 PC; 264/171; 264/211; 264/540
[58] Field of Search ................ 260/860; 204/211, 171, 204/540

[56] References Cited

U.S. PATENT DOCUMENTS

| 3,038,874 | 6/1962 | Laakso et al. | 260/860 X |
| 3,166,606 | 1/1965 | Reinking et al. | 260/860 |
| 3,334,154 | 8/1967 | Kim | 260/860 |
| 3,647,747 | 3/1972 | Bialous | 260/45.75 R |
| 3,890,266 | 6/1975 | Serini et al. | 260/37 PC |
| 4,081,495 | 3/1978 | Freitag | 260/860 |

FOREIGN PATENT DOCUMENTS 702625 1/1965 Canada.
725726 1/1966 Canada.

Primary Examiner—Richard B. Turer
Attorney, Agent, or Firm—Gene Harsh; Lawrence S. Pope

[57] ABSTRACT

The present invention relates to mixtures comprising about 60% by weight to 5% by weight of aromatic polycarbonates which have a $\overline{M}w$ between about 60,000 and 120,000 (component A) and about 40% by weight to 95% by weight of aromatic polycarbonates which have a $\overline{M}w$ between about 28,000 and 40,000 (component B), as well as to processes for their preparation and their use for the production of shaped articles. The melt which can be prepared from the mixtures according to the invention has a high stability and the films obtainable therefrom have a high resistance towards stress cracking.

11 Claims, No Drawings

POLYCARBONATE MIXTURES WHICH CAN BE PROCESSED AS THERMOPLASTICS

BACKGROUND OF THE INVENTION

Mixtures of polycarbonates are known. See, for example, DT-OS (German Published Specification) No. 2,243,226, DT-OS (German Published Specification) No. 2,446,432, U.S. Pat. No. 3,038,874, U.S. Pat. No. 3,334,154, Canadian Patent Specification No. 725,726, U.S. Pat. No. 3,647,747, DT-OS (German Published Specification) No. 2,354,533 (LeA 15,318) and DT-OS (German Published Specification) No. 2,248,817 (LeA 14,668), as well as U.S. Pat. No. 3,166,606 and Canadian Patent Specification No. 702,625.

In each of the first seven literature references mentioned, one polycarbonate component of the polycarbonate mixtures is a halogen-containing polycarbonate.

In DT-OS (German Published Specification) No. 2,248,817 and U.S. Pat. No. 3,890,266, one polycarbonate component of the polycarbonate mixtures is a polycarbonate obtained from tetramethylbisphenols.

Polycarbonate mixtures with improved flow properties during extrusion and in injection molding are prepared according to U.S. Pat. No. 3,166,606 and Canadian Patent Specification No. 702,625. The polycarbonate components are characterized by their reduced viscosity. The high-molecular weight polycarbonate component has a reduced viscosity of at least 0.6 dl/g which corresponds to a weight average molecular weight, $\overline{M}w$, of at least about 32,000 for bisphenol-A-polycarbonates, and the low-molecular weight polycarbonate component has a reduced viscosity of not more than 0.5 dl/g which corresponds to a weight average molecular weight $\overline{M}w$, of not more than about 26,500 for bisphenol-A-polycarbonates. Moreover, the difference between the reduced viscosities of the polycarbonate components should be not less than 0.2 dl/g, and the reduced viscosity of the mixtures should be between 0.4 and 0.8 dl/g.

The polycarbonates obtained from bisphenol A which are usually suitable for injection moulding and extrusion are susceptible to stress cracking in the presence of certain organic liquids which do not dissolve polycarbonates and in the presence of unsaturated compounds, for example styrene solutions of unsaturated polyesters. Although increasing the molecular weight $\overline{M}w$ of the polycarbonates to over about 70,000 indeed overcomes the tendency towards stress cracking, it is no solution to the problem because polycarbonates of this type with a $\overline{M}w$ of over about 70,000 can no longer be processed on extruders to give films. The modification of polycarbonates by special branching according to DT-OS (German Published Specification) No. 2,254,917 (LeA 14,719) and U.S. Pat. No. 3,931,108 has thus been found as a way of producing extruded polycarbonate films which are resistant towards stress cracking.

The simpler way according to the present invention, namely of preparing polycarbonate mixtures which do not have the disadvantages of either one or the other polycarbonate component, by adding linear, high-molecular weight polycarbonates, which cannot be processed as thermoplastics without reduction in the molecular weight, to polycarbonates which are customarily suitable for injection molding and extrusion could not be predicted from the state of the art.

SUMMARY OF THE INVENTION

The present invention relates to mixtures comprising about 60% by weight to 5% by weight of aromatic polycarbonates which have a $\overline{M}w$ between about 60,000 and 120,000 (component A) and about 40% by weight to 95% by weight of aromatic polycarbonates which have a $\overline{M}w$ between about 28,000 and 40,000 (component B), as well as to processes for their preparation and their use for the production of shaped articles.

The melt which can be prepared from the mixtures according to the invention has a high stability and the films obtainable therefrom have a high resistance towards stress cracking.

DETAILED DESCRIPTION OF THE INVENTION

Aromatic polycarbonates in the sense of the present invention are those obtained from halogen-free diphenols and, optionally, halogen-free chain stoppers.

Aromatic polycarbonates in the sense of the invention are, in particular, homopolycarbonates obtained from bis-2-(4-hydroxyphenyl)-propane (bisphenol A) and copolycarbonates obtained from at least about 30 mol %, preferably at least about 60 mol % and in particular at least about 80 mol %, of bisphenol A and up to about 70 mol %, preferably up to about 40 mol % and in particular up to about 20 mol %, from other halogen-free diphenols. (The mol percents relate in each case to total molar amounts of co-condensed diphenols).

Other halogen-free diphenols which are suitable are bis-(hydroxyaryl)-$C_1$-$C_8$-alkanes other than bisphenol A as well as bis-(hydroxyaryl)-$C_5$-$C_6$-cycloalkanes, in particular bis-(4-hydroxyphenyl)-$C_1$-$C_8$-alkanes and bis-(hydroxyphenyl)-$C_5$-$C_6$-cycloalkanes.

Examples of other halogen-free diphenols which are suitable are bis-(4-hydroxyphenyl)-methane (bisphenol F), 2,4-bis-(4-hydroxyphenyl)-butane, 1,1-bis-(4-hydroxyphenyl)-cyclohexane, 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, 2,4-bis-(3,5-dimethyl-4-hydroxyphenyl)-2-methylbutane and 1,1-bis-(3,5-dimethyl-4-hydroxyphenyl)-cyclohexane.

Polycarbonates which are preferred according to the invention contain bisphenol A and 1,1-bis-(4-hydroxyphenyl)-cyclohexane (bisphenol Z).

The polycarbonate mixtures according to the invention can be mixtures comprising homopolycarbonates and/or copolycarbonates, and the polycarbonate component A may differ from the polycarbonate component B not only in the higher molecular weight, but it can also differ in that it has a different molecular composition.

Aromatic polycarbonates which have molecular weights (weight-average $\overline{M}w$, for example measured by the light scattering method) of about 28,000 to 40,000, preferably of about 29,000 to 39,000 and in particular of about 30,000 to 35,000, are to be understood as polycarbonate component B.

Aromatic polycarbonates which have molecular weights (weight-average $\overline{M}w$, for example measured by the light scattering method) of about 60,000 to 120,000, preferably of about 65,000 to 110,000 and in particular of about 70,000 to 95,000, are to be understood as polycarbonate component A.

They can be prepared by known methods, for example from the abovementioned bisphenols, it being possible to use, for example, phenol and p-tert.-butylphenol as a chain stopper. Known polycarbonate preparation methods are described, for example, in U.S. Pat. No. 3,028,365 incorporated herein by reference.

The polycarbonate mixtures according to the invention comprise about 60% by weight to 5% by weight, preferably about 50% by weight to 15% by weight and in particular about 40% by weight to 20% by weight, of polycarbonate component A and about 40% by weight to 95% by weight, preferably about 50% by weight to 85% by weight and in particular about 60% by weight to 80% by weight of polycarbonate component B, in each case relative to the sum of polycarbonate components A+B.

The polycarbonate mixtures according to the invention can be prepared by one of the following process variants:

1. By melting polycarbonate components A and B together, the melts being simultaneously or subsequently intimately mixed, and then extruding the homogenized melt in a suitable apparatus.
2. By melting polycarbonate component B in a suitable apparatus and metering polycarbonate component A into the melt of component B, homogenizing the mixture and then extruding it in a suitable apparatus.
3. By mixing solutions of polycarbonate components A and B, evaporating off the solvent, a melt of the polycarbonate mixing being produced, and simultaneously extruding this melt.
4. By admixing a solution of polycarbonate component A to the melt of polycarbonate component B, evaporating off the solvent, a melt of polycarbonate component A being produced, homogenizing the melts and then extruding the mixture in a suitable apparatus.

Processes 2 to 4 are preferred mixing processes, and mixing process 4 is particularly preferred.

Mills, kneading mixtures and screw machines are to be understood as suitable equipment for the preparation of the polycarbonate mixtures according to the invention. Screw machines, in particular twin screw machines, are the preferred equipment.

Suitable solvents for the abovementioned mixing processes are all the solvents which are known for polycarbonates, preferably methylene chloride and chlorobenzene.

Depending on the intended use, the polycarbonate mixtures obtainable according to the invention can be shaped on known processing machines by known methods to give extruded shaped articles or injection-molded articles. Particular fields of application are containers, tubes, sheets and films.

Additives of the customary type can be added to the polycarbonate mixtures according to the invention before, during or after mixing the polycarbonate components. In this connection there may be mentioned, for example, dyestuffs, pigments, mold release agents, stabilizers against the action of moisture, heat and UV light, lubricants and fillers, such as glass powder, quartz products, graphite, molybdenum sulphide, metal powders, powders of higher-melting plastics, for example polytetrafluoroethylene powders, natural fibers, such as cotton, sisal and asbestos, and furthermore glass fibers of the most diverse nature, metal filaments and fibers which are stable during their residence in the melt of the polycarbonates and which do not noticeably damage the polycarbonates.

EXAMPLES

EXAMPLE 1

A polycarbonate which had a $\overline{M}w$ of about 30,000 (component B) was metered, via a weigh feeder, into the hoppers on a twin-screw extruder with a metering dome and a venting dome. A polycarbonate which had a $\overline{M}w$ of about 70,000 (component A) was metered, via a second weigh feeder, into the metering dome of the twin-screw extruder, into the polycarbonate which had already melted at this point (component B). The weigh feeders were adjusted so that the mixture of polycarbonates comprises about 70% by weight of component B and about 30% by weight of component A. The homogenized melt of the mixture was forced out via a sheet die and drawn to films about 40 μm thick over a chill-roll unit.

Compared to films which have been prepared from only component B by the extrusion process, the films exhibit the following properties:

| | Film according to the invention | Film consisting of 100% of component B |
| --- | --- | --- |
| Tensile strength [MPa] | 90 | 90 |
| Elongation [%] | 100 | 100 |
| Residual elongation after storing for 10 seconds in toluene/n-propanol 1 : 3 [%] | 90 | embrittled (< 3%) |
| Resistance towards unsaturated polyester resins | resistant | not resistant |

EXAMPLE 2

Films were produced according to Example 1, using about 80% by weight of component B and about 20% by weight of a polycarbonate which had a $\overline{M}w$ of 95,000.

| Properties: | Film according to the invention | Film consisting of 100% of component B |
| --- | --- | --- |
| Tensile strength [MPa] | 90 | 90 |
| Elongation [%] | 110 | 100 |
| Residual elongation after storing for 10 seconds in toluene/n-propanol 1:3 [%] | 90 | embrittled (<3%) |
| Resistance towards unsaturated polyester resins | resistant | not resistant |

EXAMPLE 3

A mixture according to the invention, which was prepared according to Example 1, extruded as a strand and granulated, was processed on a bottle blowing unit to give bottles with a capacity of 1 liter and a wall thickness of 2 mm.

Processing conditions:

| Barrel | temperatures [C.°] Mixture according to the invention | 100% of component B |
|---|---|---|
| Intake | 270° C. | 260° C. |
| Zone 1 | 275° C. | 270° C. |
| Zone 2 | 280° C. | 270° C. |
| Adapter | 280° C. | 270° C |
| Head space | | |
| Zone 1 | 260° C. | 250° C. |
| Zone 2 | 270° C. | 260° C. |
| Nozzle | 240° C. | 240° C. |
| Mold temperature | 70° C. | 70° C. |

Compared with the bottle made for 100% of component B, the bottle produced the following properties in the purification test and sterilization test:

| | Bottle made of the mixture according to the invention | Bottle made of 100% of component B |
|---|---|---|
| Number of purification cycles in 4% strength sodium carbonate solution at 80° C. until cracks appear | >100 | <40 |
| Number of sterilization at 135° C. until cracks appear | >100 | <60 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A halogen-free polycarbonate mixture consisting essentially of (A) from about 15 to 50% by weight of an aromatic polycarbonate having a weight average molecular weight ($\overline{M}w$) of from about 70,000 to 120,000 and (B) from about 85 to 50% by weight of an aromatic polycarbonate having a weight average molecular weight ($\overline{M}w$) of from about 29,000 to 39,000, said aromatic polycarbonates being selected from a group consisting of homopolycarbonates obtained from bisphenol A and copolycarbonates obtained from at least about 80 mol % of bisphenol A and up to about 20 mol % of other halogen-free diphenols, based on the total molar amount of diphenols.

2. A mixture according to claim 1 comprising from about 20% to 40% by weight of component (A) and from about 80% to 60% by weight of component (B).

3. A mixture according to claim 1 wherein component (A) has a $\overline{M}w$ of from about 70,000 to 95,000.

4. A mixture according to claim 1 wherein component (B) has a $\overline{M}w$ of from about 30,000 to 35,000.

5. A process for the preparation of a polycarbonate mixture according to claim 1 consisting essentially of melting together polycarbonate components (A) and (B), intimately mixing the resulting melts of polycarbonate components (A) and (B) and then extruding the resulting mixture.

6. A process for the preparation of a polycarbonate mixture according to claim 1 consisting essentially of mixing a solution of polycarbonate component (A) with a melt of polycarbonate component (B), evaporating the solvent from the solution of polycarbonate component (A) to produce a melt of polycarbonate component (A), homogenizing the melts of polycarbonate components (A) and (B) and extruding them.

7. A process for the preparation of a polycarbonate mixture according to claim 1 consisting essentially of metering polycarbonate component (A) into the melt of polycarbonate component (B), homogenizing the mixture and extruding it.

8. A process for the preparation of a polycarbonate mixture according to claim 14 consisting essentially of mixing solutions of polycarbonate components (A) and (B), evaporating the solvent from the solutions of polycarbonate components (A) and (B) to produce a melt of the polycarbonate mixture, and then extruding the mixture.

9. A process according to any one of claims 5, 6, 8 or 9 wherein the mixtures are extruded in a screw machine.

10. Shaped articles produced from the polycarbonate mixture according to claim 1.

11. Films produced from the polycarbonate mixture according to claim 1.

* * * * *